(12) United States Patent
Rouffie et al.

(10) Patent No.: US 12,180,565 B2
(45) Date of Patent: Dec. 31, 2024

(54) NICKEL-BASED SUPERALLOY

(71) Applicants: SAFRAN, Paris (FR); OFFICE NATIONAL D'ETUDES ET DE RECHERCHES AEROSPATIALES, Palaiseau (FR)

(72) Inventors: Anne-Laure Rouffie, Moissy-Cramayel (FR); Jean-Michel Patrick Maurice Franchet, Moissy-Cramayel (FR); Didier Locq, Le Plessis Robinson (FR)

(73) Assignees: SAFRAN, Paris (FR); OFFICE NATIONAL D'ETUDES ET DE RECHERCHES AEROSPATIALES, Palaiseau (FR)

( * ) Notice: Subject to any disclaimer, the term of this patent is extended or adjusted under 35 U.S.C. 154(b) by 458 days.

(21) Appl. No.: 17/781,596

(22) PCT Filed: Dec. 9, 2020

(86) PCT No.: PCT/FR2020/052364
§ 371 (c)(1),
(2) Date: Jun. 1, 2022

(87) PCT Pub. No.: WO2021/116607
PCT Pub. Date: Jun. 17, 2021

(65) Prior Publication Data
US 2023/0011910 A1   Jan. 12, 2023

(30) Foreign Application Priority Data

Dec. 11, 2019 (FR) ..................... 1914142

(51) Int. Cl.
| | |
|---|---|
| *C22C 19/05* | (2006.01) |
| *C22C 1/04* | (2023.01) |
| *C22F 1/10* | (2006.01) |

(52) U.S. Cl.
CPC .......... *C22C 19/056* (2013.01); *C22C 1/0433* (2013.01); *C22F 1/10* (2013.01)

(58) Field of Classification Search
CPC ................... C22C 19/056; C22F 1/10
See application file for complete search history.

(56) References Cited

U.S. PATENT DOCUMENTS

2015/0354358 A1   12/2015   Grande, III vet al.

FOREIGN PATENT DOCUMENTS

| CN | 108441705 A | 8/2018 |
|---|---|---|
| EP | 1 840 232 A1 | 10/2007 |
| EP | 2 591 135 A2 | 5/2013 |
| EP | 3 257 963 A1 | 12/2017 |
| FR | 3 043 410 A1 | 5/2017 |
| JP | 2018-188738 A | 11/2018 |
| WO | WO 2012/047352 A2 | 4/2012 |

OTHER PUBLICATIONS

International Search Report as issued in International Patent Application No. PCT/FR2020/052364, dated Apr. 20, 2021.
Guédou, J.-Y., et al., "Development of a new fatigue and creep resistant PM nickel-base superalloy for disk applications," Proceedings of Superalloys, (2008), pp. 21-30.

*Primary Examiner* — Jessee R Roe
(74) *Attorney, Agent, or Firm* — Pillsbury Winthrop Shaw Pittman LLP

(57) ABSTRACT

A Nickel-based superalloy, whose composition includes, in percent by weight of the total composition: Chromium: 10.0-11.25; Cobalt: 11.2-13.7; Molybdenum: 3.1-3.8; Tungsten: 3.1-3.8; Aluminium: 2.9-3.5; Titanium: 4.6-5.6; Niobium: 1.9-2.3; Hafnium: 0.25-0.35; Zirconium: 0.040-0.060; Carbon: 0.010-0.030; Boron: 0.01-0.030; Nickel: remainder as well as unavoidable impurities; the composition being free of tantalum.

18 Claims, 2 Drawing Sheets

NICKEL-BASED SUPERALLOY

CROSS-REFERENCE TO RELATED APPLICATIONS

This application is the U.S. National Stage of PCT/FR2020/052364, filed Dec. 9, 2020, which in turn claims priority to French patent application number 1914142 filed Dec. 11, 2019. The content of these applications are incorporated herein by reference in their entireties.

The present invention concerns the field of nickel-based superalloys for high temperature applications and developed for a turbine disc application with coarse-grain/fine-grain dual structure. This alloy is intended to withstand temperatures of order 800° C. in the hottest portion of the part and temperature peaks up to 850° C., while retaining a high mechanical strength in the portion of the disc operating at lower temperature.

The new environmental standards (ACARE 2020) as well as the requirements of reduced cost of ownership imposed by aircraft manufacturers, require engine manufacturers to provide increased performance of new generation turbojet engines with, in particular, a strong reduction in the specific consumption. This translates into a need to improve the efficiency of the engine while reducing ventilation of the hot parts and, in particular, of the discs. The direct consequence is then a need for materials with improved temperature capability.

Many advances have been made in the field of materials to increase their temperature capability: more refractory materials, powder metallurgy technology, etc. However, today, the gains in temperature are very limited and the chemical composition of the material alone will not be able to meet the objectives set. Indeed, today, for a turbine disc application, the performance of a material resides in its capacity to produce, for an optimised homogeneous microstructure, the best compromise between the various, often contradictory, mechanical properties required.

One way of pushing the limits of current materials is to adapt the microstructure and thus the mechanical properties associated with local stresses of the part, in other words to produce, on a given part, a dual- or gradient-microstructure. For example, a turbine disc, which is one of the most thermomechanically stressed parts in the turbojet engine, would require both a fine-grain structure in the bore of the disc for its tensile and fatigue properties at medium temperature, and a coarse-grain structure in the rim of the same disc in order to have better creep and cracking properties at high-temperature.

The thermal treatment method enabling alloys having such a dual structure to be obtained is known, as described in patent application FR3043410. This application presents a method for producing the structure gradients on a disc-type part via a heat treatment which itself has a gradient. This involves heat treatment by induction, which makes it possible to produce a solution heat treatment at a temperature that is stepped in the part, such that:

in the hottest region, the temperature is greater than the dissolution temperature of the phase blocking the grain boundaries, also called the solvus temperature (for gamma-gamma prime nickel-based alloys; the is phase in question is the gamma prime phase).

in the least hot region, the temperature is less than this solvus temperature.

Thus, in the zones in which the temperature exceeds the solvus temperature of the gamma prime phase, the grains will increase in size in order to form a structure favourable to the creep and cracking properties, whereas in the zones in which the temperature remains less than the solvus temperature, the structure will retain the grain size originating from the forging, which is generally relatively fine and favourable to the tensile and fatigue properties.

In general, the application of a gradient treatment is carried out on an existing "conventional" alloy, the chemical composition of which has been optimised in order to produce, with a homogeneous structure throughout the part, the best compromise in the required mechanical properties. Hence, the highest performing superalloys for discs have a target operating temperature of 760° C., optionally with peaks to 800° C. However, the existing chemical compositions are not optimum for the configuration of a gradient treatment. The improvement in performance of the part therefore requires the definition of a chemical composition specific to a gradient treatment of the part.

An example of a known nickel-based alloy is described in document EP1840232 or in the article of J-Y. Guédou et al. (Development of a new fatigue and creep resistant PM nickel-base superalloy for disk applications, Proceedings of Superalloys 2008). This alloy is marketed under the reference N19 (SM043).

This alloy example, like the alloys of the invention, is one of the two-phase alloys which comprise: a so-called gamma phase formed by a nickel-based solid solution, which forms the matrix for the metallurgical grains, and a so-called gamma prime phase, the structure of which is based on the is ordered intermetallic compound $Ni_3Al$. The gamma prime phase forms a plurality of populations of inter-granular or intra-granular precipitates, which appear at different steps in the thermomechanical history of the alloy and which have distinct roles in the mechanical behaviour of the alloy. The nickel-based superalloys are, therefore, materials with a gamma austenitic nickel-based matrix (face-centred cubic, thus relatively ductile) reinforced by the gamma prime hardening precipitates (of structure $L1_2$) coherent with the matrix, in other words having an atomic lattice cell very close to this.

The density of these alloys is also a point of interest. However, the prior art from the last 10 years shows a strong trend towards the use of higher and higher tantalum contents, which translates to an increase in the density of the alloys.

Thus, in addition to improved performance in terms of mechanical properties at the temperatures of the disc zones considered, the chemical composition will lead to the following intrinsic properties of the alloy:

controlled density: <8500 $kg/m^3$;

metallurgical stability (absence of TCP phases—Topological Compact

Phases) up to 800-850° C.;

good oxidation resistance;

a difference between the gamma prime solvus temperature and the burning temperature of the alloy that is sufficiently large for the performance of the supersolvus treatment.

The inventors have surprisingly discovered that it was possible to obtain such properties using a nickel-based superalloy that is free from tantalum and having lower chromium content than the alloy described in EP1840232 and in particular than the highest performing commercial alloy (N19/SM043).

The present invention therefore relates to a nickel-based superalloy, characterised in that its composition comprises, advantageously essentially consists of, in particular consists of, in percent by weight of the total composition:

Chromium: 10.0-11.25, advantageously 10.0-11.0;
Cobalt: 11.2-13.7, advantageously 12.0-13.0;
Molybdenum: 3.1-3.8, advantageously 3.3-3.7;
Tungsten: 3.1-3.8, advantageously 3.1-3.5;
Aluminium: 2.9-3.5, advantageously 3.2-3.5;
Titanium: 4.6-5.6, advantageously 4.6-5.0;
Niobium: 1.9-2.3, advantageously 1.9-2.0;
Hafnium: 0.25-0.35, advantageously 0.25-3.0;
Zirconium: 0.040-0.060, advantageously 0.050-0.060;
Carbon: 0.010-0.030, advantageously 0.015-0.025;
Boron: 0.01-0.030, advantageously 0.01-0.02;
Nickel: remainder;
as well as unavoidable impurities;
the composition being free of tantalum.

The composition of the nickel-based superalloy according to the invention thus contains the following elements:
major additional elements: Co, Cr, Mo, W, Al, Ti, Nb;
minor additional elements (lower concentration in percent by mass): Hf, C, B, Zr.

The composition according to the invention thus comprises, in percent by weight relative to the total weight of the composition, chromium (Cr) at a content in the range 10.0-11.25, advantageously 10.0-11.2, in particular 10.0-11.0, more particularly 10.3-10.9. The chromium content is measured with an uncertainty of ±0.2, advantageously±0.15.

The composition according to the invention further comprises, in percent by weight relative to the total weight of the composition, cobalt (Co) at a content in the range 11.2-13.7, advantageously 12.0-13.0, in particular 12.2-12.8. The cobalt content is measured with an uncertainty of ±0.3, in particular ±0.2, advantageously±0.15.

The composition according to the invention additionally comprises, in percent by weight relative to the total weight of the composition, molybdenum (Mo) at a content in the range 3.1-3.8, advantageously 3.2-3.7, in particular 3.3-3.7. The molybdenum content is measured with an uncertainty of ±0.04, in particular ±0.02, advantageously±0.01.

The composition according to the invention further comprises, in percent by weight relative to the total weight of the composition, tungsten (W) at a content in the range 3.1-3.8, advantageously 3.1-3.5, in particular 3.1-3.3. The tungsten content is measured with an uncertainty of ±0.04, in particular ±0.02, advantageously±0.01.

The composition according to the invention also comprises, in percent by weight relative to the total weight of the composition, aluminium (Al) at a content in the range 2.9-3.5, advantageously 3.2-3.5, in particular 3.2-3.4.

The aluminium content is measured with an uncertainty of ±0.04, in particular ±0.02, advantageously±0.01.

The composition according to the invention further comprises, in percent by weight relative to the total weight of the composition, titanium (Ti) at a content in the range 4.6-5.6, advantageously 4.6-5.0, in particular 4.7-4.9.

The titanium content is measured with an uncertainty of ±0.2, in particular ±0.1.

The composition according to the invention furthermore comprises, in percent by weight relative to the total weight of the composition, niobium (Nb) at a content in the range 1.9-2.3, advantageously 1.9-2.0. The niobium content is measured with an uncertainty of ±0.04, in particular ±0.02.

The composition according to the invention further comprises, in percent by weight relative to the total weight of the composition, hafnium (Hf) at a content in the range 0.25-0.35, advantageously 0.25-0.30, in particular 0.26-0.28. The hafnium content is measured with an uncertainty of approximately 10%.

The composition according to the invention additionally comprises, in percent by weight relative to the total weight of the composition, zirconium (Zr) at a content in the range 0.040-0.060, advantageously 0.050-0.060, in particular 0.055-0.060, more particularly 0.056-0.058. The zirconium content is measured with an uncertainty of approximately 10%. The composition according to the invention also comprises, in percent by weight relative to the total weight of the composition, carbon (C) at a content in the range 0.010-0.030, advantageously 0.015-0.025, in particular 0.019-0.023. The carbon content is measured with an uncertainty of ±0.003, in particular ±0.002.

The composition according to the invention also comprises, in percent by weight relative to the total weight of the composition, boron (B) at a content in the range 0.01-0.03, in particular 0.01-0.02. The boron content is measured with an uncertainty of approximately 10%.

The elements W, Cr, Co, and Mo mainly participate in the hardening of the so-called gamma austenitic matrix. In particular, the additions of refractory elements Mo and W improve the high-temperature resistance of the superalloys by reinforcing the gamma matrix by solid solution. However, their content must remain limited in order to avoid forming the weakening TCP phases, but also to avoid increasing the density of the alloy, due to their high atomic mass.

Furthermore, the additions of Cr and Co lower the gamma prime solvus temperature of the superalloy. Co is an element chemically close to Ni which partially substitutes this element in order to form a solid solution in the gamma phase.

In an advantageous embodiment, the sum of the contents of W, Mo, Cr and Co, in atomic percent, is greater than or equal to 25.5 and less than or equal to 29.5, i.e. $25.5 \leq W+Mo+Cr+Co \leq 29.5$.

In another advantageous embodiment, the sum of the contents of W and Mo, in atomic percent, is greater than or equal to 2.3 and less than or equal to 3.9, i.e. $2.3 \leq W+Mo\ 3.9$.

The elements Al, Ti and Nb favour the precipitation of the hardening phase $(Ni,Co)_3(Al,Ti,Nb)$ called the gamma prime phase.

Furthermore, the additions of Cr and Al improve the resistance to high temperature oxidation and corrosion of the superalloys.

The elements Ti and Nb substitute with Al in the gamma prime phase and reinforce it. However, advantageously the ratio of the contents (Ti+Nb)/Al, in atomic percent, must remain less than 1.2 in order to avoid stabilising the eta or delta phase ($Ni_3Ti$, $Ni_3Nb$ type) in place of the gamma prime phase and thus destabilising the gamma prime phase, i.e. (Ti+Nb)/Al<1.2.

Hence, in an advantageous embodiment, the nickel-based superalloy according to the invention has a volume fraction of gamma prime phase between 52% and 60%, advantageously with the sum of the contents of Al, Ti and Nb, in atomic %, between 13 and 15, i.e. 13<Al+Ti+Nb<15, and in particular a ratio of the contents (Ti+Nb)/Al, in atomic %, less than 1.2, i.e. (Ti+Nb)/Al<1.2.

The elements Hf, C, B and Zr favour the resistance of the grain boundaries by forming carbide and boride precipitates.

In particular, the addition of Hf improves the oxidation resistance of the grain boundaries, which has a beneficial effect on the resistance to the propagation of cracks.

The composition of the superalloy according to the invention is free from tantalum. Indeed, tantalum (Ta) participates in the reinforcement of the gamma prime phase but has the effect of increasing the density of the alloy.

The unavoidable impurities of the composition according to the invention come from the manufacturing steps of the superalloy or from the impurities present in the raw materials used for the manufacture of the superalloy. All the conventional impurities encountered in nickel-based superalloys are found. In particular they are chosen from the group consisting of manganese, silicon, vanadium, sulfur, phosphorus, copper, lead, iron, bismuth, nitrogen, oxygen, hydrogen and the mixtures thereof. They can constitute up to 1% by mass of the alloy and each represent no more than 0.5% by weight of the total composition. In general, the content of impurities in the alloy is measured with an uncertainty of 10%. In an advantageous embodiment, the nickel-based superalloy according to the invention is characterised in that its composition comprises, advantageously essentially consists of, in particular consists of, in percent by weight of the total composition:

Chromium: 10.0-11.0, advantageously 10.3-10.9;
Cobalt: 12.0-13.0, advantageously 12.2-12.8;
Molybdenum: 3.2-3.7, advantageously 3.3-3.7;
Tungsten: 3.1-3.5, advantageously 3.1-3.3;
Aluminium: 3.2-3.5, advantageously 3.2-3.4;
Titanium: 4.6-5.0, advantageously 4.7-4.9;
Niobium: 1.9-2.0;
Hafnium: 0.25-0.030, advantageously 0.26-0.028;
Zirconium: 0.050-0.060, advantageously 0.055-0.060;
Carbon: 0.015-0.025, advantageously 0.019-0.023;
Boron: 0.01-0.02;
Nickel: remainder
as well as unavoidable impurities;
the composition being free of tantalum.

In particular, the composition of the superalloy according to the present invention can be as indicated in Table 1 below.

TABLE 1

|    | EX 1 (% by mass) | EX 1 (at %) |
|----|------------------|-------------|
| Ni | Base             | Base        |
| Cr | 10.61            | 11.74       |
| Co | 12.51            | 12.22       |
| Mo | 3.50             | 2.10        |
| W  | 3.18             | 1.00        |
| Nb | 1.97             | 1.22        |
| Al | 3.31             | 7.06        |
| Ti | 4.82             | 5.79        |
| C  | 0.021            | 0.101       |
| B  | 0.0144           | 0.077       |
| Zr | 0.057            | 0.036       |
| Hf | 0.267            | 0.086       |
| Ta | 0                | 0           |

In an advantageous embodiment, the superalloy according to the invention has a density less than 8500 kg/m$^3$, advantageously less than 8300 kg/m$^3$. Hence, the density of the superalloy of Example 1 is 8240 kg/m$^3$. The volume measurement is carried out by helium pycnometry and the mass measurement is carried with a precision balance, then the density is calculated using these two measurements.

In another advantageous embodiment, the superalloy according to the invention has a metallurgical stability (in other words an absence of TCP phases—Topological Compact Phases) up to 800-850° C.

In yet another advantageous embodiment, the superalloy according to the invention has good oxidation resistance.

In yet another advantageous embodiment, the superalloy according to the invention has a difference between the gamma prime solvus temperature and the burning temperature that is sufficiently large for the performance of the supersolvus treatment, advantageously a difference of at least 15° C. Hence, the gamma prime solvus temperature of the superalloy of Example 1 is 1195° C. and its burning temperature is 1210° C.

The present invention further relates to the superalloy powder according to the invention. More specifically, the superalloy according to the invention can be found in the form of a powder with a particle size distribution between 10 μm and 100 μm.

The present invention further relates to a method for manufacturing a powder of nickel-based superalloy according to the invention, comprising the following steps:

A—mixing the elementary or pre-alloyed raw materials;
B—melting the mixture obtained in step A), advantageously in a vacuum induction oven (VIM);
C—gas atomisation, advantageously with argon, of the product obtained in step B) so as to obtain a powder that is advantageously mostly spherical (in other words without sharp corners);
D—sieving the powder obtained in step C), advantageously under an inert atmosphere, so as to obtain the targeted particle size distribution;
E—recovering the resulting powder.

The particle size distribution of the powder is thus adapted according to the technology for manufacturing the envisaged superalloy powder-based parts. The range of particle size distributions used for the various manufacturing methods varies according to the technology, the equipment and the targeted applications. In general, if all the applications are combined, the powder used for these methods will have more or less wide particle size distributions by number of between 10 μm and 100 μm. The present invention further relates to a method for manufacturing a part, in particular a turbine part, made of superalloy according to the invention or made of superalloy powder according to the invention, characterised in that it comprises the following steps:

a—forging,
b—gradient heat treatment of the part obtained in step a),
c—final heat treatment of the entire dual-microstructure part obtained in step b)
d—recovery of the part obtained in step c).

Forging step a) can be implemented by methods that are well known to a person skilled in the art. It may involve, for example, extrusion, in particular hot extrusion, rolling, die forging (such as isothermal forging for example), drop forging, drawing and/or a mixture of these techniques. These techniques are well known to a person skilled in the art. This step a) makes it possible to obtain a part made of superalloy.

Gradient heat treatment step b) can be implemented using the method and device described in patent application FR3043410.

It can also comprise heating of a region of the part at a first temperature (T1) at least 5° C. greater than the solvus temperature of the gamma prime phase of said superalloy and less than the melting temperature of said superalloy (it thus involves a supersolvus treatment).

The gradient heat treatment can, for example, be carried out by local induction heating or by any method or device described in FR3043410. In the case where the part is a turbine disc, the region of the part subjected to the first temperature (T1) consists of the rim region of the disc, the rest of the part not being impacted by this treatment. Thus, the supersolvus treatment (temperature T1) makes it possible to use 100% of the hardening potential associated with the gamma prime phase in order to retain a hardening that is still effective at high temperature (800° C. and can even withstand peaks up to 850° C.), while increasing the grain size in order to improve the resistance to creep and cracking. The grain size is thus advantageously greater than or equal to 15 µm (measured by the intercepts method). The grain size is advantageously 40 µm on average in order to retain a good fatigue resistance.

Step b) thus makes it possible to obtain a dual- or gradient-microstructure part, in other words not having a homogeneous microstructure, for which the size of the grains, in particular, is not the same, depending on whether they are in the region of the part having undergone the supersolvus treatment or in that not having been impacted by the supersolvus treatment. It thus contains coarse grains and fine grains, advantageously coarse grains having a size greater than or equal to 15 µm, for example in the rim of the disc, and fine grains originating from the forging having a size less than 15 µm, for example in the bore of the disc. The size of the grains is measured by the intercept method.

Step c) of the method according to the invention can comprise the following successive steps:
- c1—solution heat treatment of the entire part obtained in step b) at a temperature (T2) less than the solvus temperature of the gamma prime phase of said superalloy (it therefore involves a subsolvus treatment);
- c2—quenching treatment of the entire part obtained in step c1); advantageously the quenching rate is adapted to the mass of the part in is order to obtain an optimum size and distribution of the gamma prime hardening phase.
- c3—tempering treatment of the entire part obtained in step c2), advantageously at a temperature greater than 760° C.

The final heat treatment of step c) is thus the conventional heat treatment of gamma/gamma prime alloys. The objective of this treatment is to treat the structure that is not impacted by the gradient treatment in order to have, in these zones, a final structure and thus the mechanical properties equivalent to the desired level. More specifically, in the region that is only treated in subsolvus (temperature T2), the size of the grains remains low, advantageously less than 10 µm (measured by the intercept method), which makes it possible to obtain good tensile and fatigue properties at medium temperatures, for example below 750° C.

In particular, step c3) can consist of a single-stage or double-stage tempering treatment.

Hence, a relatively hot final tempering treatment (>760° C.) stabilises the microstructure of the part at high temperature. It also relaxes the residual stresses originating from the quenching and from the treatment at temperature T2.

The tempering and quenching treatments are implemented using techniques that are well known to a person skilled in the art. The present invention finally relates to a part made of superalloy according to the present invention or made of superalloy powder according to the present invention, having a dual-microstructure, advantageously obtainable by the method according to the present invention. Advantageously, it is a turbomachine part, more advantageously a turbine part, in particular a turbine disc, a compressor disc, a ring, a flange or a turbine housing.

The part according to the invention thus has a dual- or gradient-microstructure, in other words it is not a homogeneous microstructure. In particular, the size of the grains of the part are not the same depending on the region of part. It thus contains coarse grains and fine grains, advantageously coarse grains having a size greater than or equal to 15 µm, advantageously 40 µm on average, and fine grains having a size less than 15 µm. Hence, in the case where the part is a turbine disc, the rim region of the disc has coarse grains, advantageously having grains with a size greater than or equal to 15 µm, advantageously 40 µm on average, and the bore region of the disc has fine grains, advantageously having grains with a size less than 15 µm. The size of the grains is measured by the intercept method.

Advantageously, the coarse-grain region of the part has good creep resistance according to standard NF EN ISO 24 Aug. 2009 at a temperature of 800° C., more advantageously a duration greater than 160 hours, in particular greater than 170 hours, more particularly greater than 175 hours, to 0.2% elongation under a stress of 500 MPa and at a temperature of 750° C. This region can even withstand excursions to temperatures of 850° C.

Advantageously, the fine-grain region of the part has a good tensile strength according to standard NF EN 2002-001/06 at a temperature less than 750° C., in particular an elasticity limit at 20° C. greater than 1150 MPa. The present invention will be better understood in the light of the description of the figures and the following examples. The examples are given by way of indication and are not limiting.

EXAMPLE

A nickel-based superalloy according to the invention (Example 1) was manufactured according to the following method: vacuum casting an ingot, then atomising this ingot under argon, sieving at 53 µm, placing the powder in a container with degassing, then hot extruding of these powders in the form of a bar. The measured density of the alloy is 8240 kg/m$^3$. The volume measurement is carried out by helium pycnometry and the mass measurement is carried with a precision balance, then the density is calculated using these two measurements. The alloy contains 56.5% gamma prime phase.

The manufactured alloy has the chemical composition, in percent by mass, indicated in Table 1 above.

The solvus temperature of the gamma prime phase for this alloy is 1195° C.

A portion of the bar was then subjected to treatment at a temperature of 1200° C., thus greater than 1195° C. for a duration of 2 hours (supersolvus treatment) then cooled at 30° C./min, followed by treatment at a temperature of 1165° C., thus less than 1195° C. for a duration of 2 hours (subsolvus treatment) followed by quenching at 100° C./min and tempering at a temperature of 800° C., thus greater than 760° C. for a duration of 8 hours (thermal cycle representative of that of the rim region of a disc). The resulting microstructure has a grain size measured by the intercept method of 24 µm measured at the surface of the sample by EBSD images (Electron Back Scattered Diffraction), this size thus being greater than 15 µm.

Another portion of the bar was only subjected to the subsolvus treatment is followed by the quenching and tempering treatment, both carried out at the same temperature and for the same duration as first portion of the bar (thermal cycle representative of that of the bore region of a disc). This microstructure has a grain size of 3.5 μm measured by the intercept method, this size thus being less than 15 μm.

Tensile and creep tests were performed on samples taken from these two bars respectively according to standards NF EN 2002-001/06 and NF EN ISO 24 Aug. 2009.

The results were compared to the compositions of the prior art produced by powder metallurgy and homogeneous heat treatment, having the composition in percent by mass as indicated in Table 2 below:

TABLE 2

| % mass | ME501 | Alloy A according to EP2628810 | Rene88 (commercially available) | SMO43 (N19 commercially available) |
|---|---|---|---|---|
| Ni | Base | Base | Base | Base |
| Cr | 12 | 10.18 | 16 | 13.3 |
| Co | 18 | 20.49 | 13 | 12.2 |
| Mo | 2.9 | 3.61 | 4 | 4.6 |
| W | 3.0 | 2.22 | 4 | 3.0 |
| Nb | 1.5 | 2.08 | 0.7 | 1.5 |
| Al | 3.0 | 3.53 | 2.1 | 2.9 |
| Ti | 3.0 | 3.03 | 3.7 | 3.6 |
| C | 0.05 | 0.035 | 0.05 | 0.015 |
| B | 0.03 | 0.040 | 0.015 | 0.01 |
| Zr | 0.05 | 0.058 | 0.05 | 0.05 |
| Hf | 0.4 | <0.01 | 0 | 0.25 |
| Ta | 4.8 | 4.76 | 0 | 0 |

Figure 1:
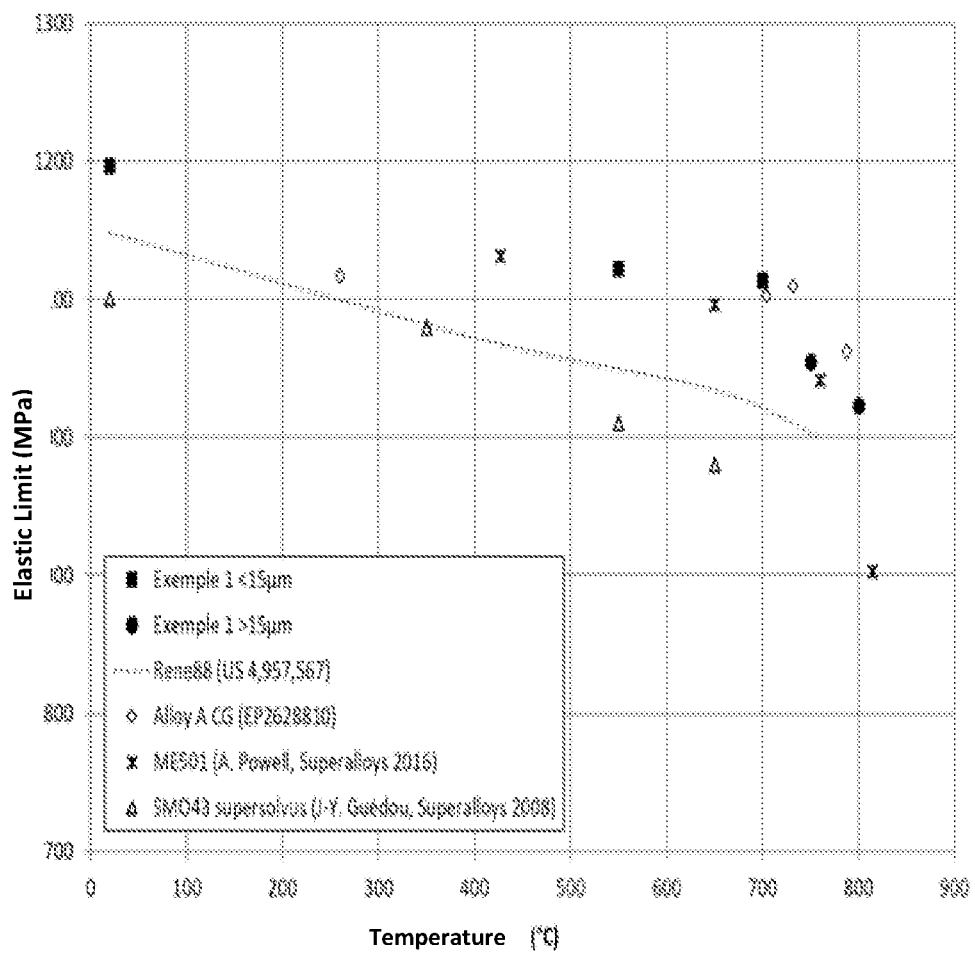
FIG. 1 shows the comparison of the elastic limit (in MPa as a function of the temperature in ° C. according to standard NF EN 2002-001/06) of the superalloy according to Example 1 with other alloys for discs made by powder metallurgy of the prior art.
Figure 2:
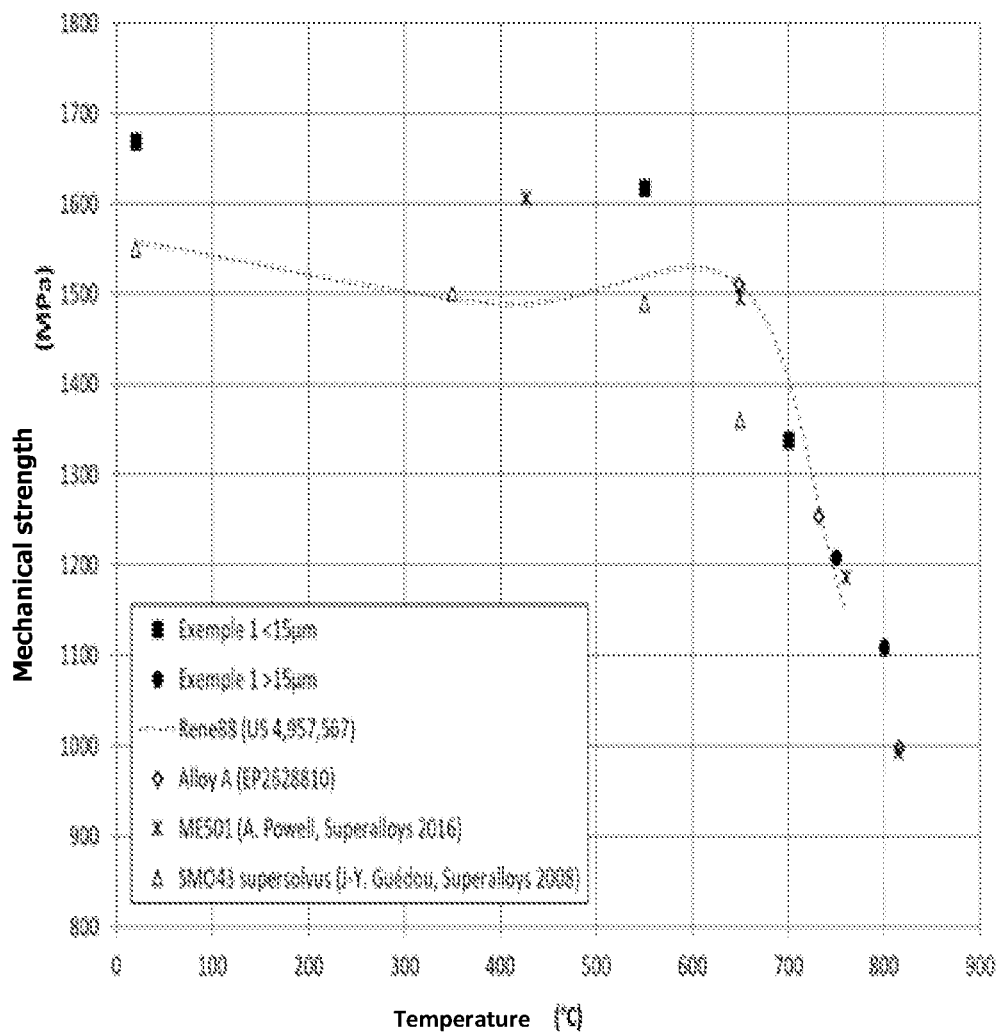
FIG. 2 shows the comparison of the mechanical strength (in MPa as a function of the temperature in ° C. according to standard NF EN 2002-001/06) of the superalloy according to Example 1 with other alloys for discs made by powder metallurgy of the prior art.

The tensile results (elastic limit and mechanical strength as a function of temperature) are indicated in FIGS. 1 and 2. The creep results are indicated in Table 3 below:

TABLE 3

| Alloy | Temperature (° C.) | Stress (MPa) | Time to 0.2% elongation (hours) |
|---|---|---|---|
| SMO43 (40-60 μm) | 750 | 500 | Approximately 150 |
| Example 1 (10-40 μm) | 750 | 500 | >179 |
| | 850 | 200 | >37 |

The tensile results for the alloy according to the invention (Example 1) are close to or even better than those for the alloys ME501 and Alloy A, these two alloys being loaded with tantalum. The tensile results are also better than for SM043 (N19), additionally producing a gain in the density of the alloy. More specifically, SM043 (N19) has a density of 8340 kg/m³. Moreover, the alloy according to the invention has undergone a final relatively hot tempering (>760° C.) relative to the alloys SM043 (final tempering at 750° C.) and ME501 (final tempering at 760° C.), in order to stabilise its microstructure at high temperature but slightly lowering the tensile strength and creep resistance. The solid squares and circles in FIGS. 1 and 2 represent the mechanical properties of the part after dual-structure treatment, and this as a function of the operating temperature seen by each region (the transition is located at 750° C.): the fine-grain region (solid squares) has a resistance optimised for temperatures less than 750° C., and the coarse-grain region (solid circles) has a resistance optimised for the temperatures greater than 750° C.

The results for elongation creep show the good resistance of the alloy according to the invention despite a finer grain size and a hotter tempering than SM043. The alloy can also withstand excursions to very high temperatures such as 850° C.

The invention claimed is:

1. A Nickel-based superalloy, whose composition comprises, in percent by weight of the total composition:

Chromium: 10.0-11.25;
Cobalt: 11.2-13.7;
Molybdenum: 3.1-3.8;
Tungsten: 3.1-3.8;
Aluminium: 2.9-3.5;
Titanium: 4.6-5.6;
Niobium: 1.9-2.3;
Hafnium: 0.25-0.35;
Zirconium: 0.040-0.060;
Carbon: 0.010-0.030;
Boron: 0.01-0.030;
Nickel: remainder
as well as unavoidable impurities;
the composition being free of tantalum.

2. The nickel-based superalloy according to claim 1, which has a volume fraction of gamma prime phase of between 52% and 60%.

3. The nickel-based superalloy according to claim 2, wherein a sum of the contents of Al, Ti and Nb in atomic % is between 13 and 15.

4. The nickel-based superalloy according to claim 2, wherein a ratio of contents (Ti+Nb)/Al in atomic % is less than 1.2.

5. The nickel-based superalloy according to claim 1, wherein a sum of the contents of W, Mo, Cr and Co, in atomic %, is greater than or equal to 25.5 and less than or equal to 29.5.

6. The nickel-based superalloy according to claim 1, wherein a sum of the contents of W and Mo, in atomic %, is greater than or equal to 2.3 and less than or equal to 3.9.

7. A powder of a superalloy according to claim 1.

8. A method for manufacturing a part made of superalloy according to claim 1, comprising the following steps:
a—forging,
b—gradient heat treatment of the part obtained in step a),
c—final heat treatment of the entire dual-microstructure part obtained in step b)
d—recovery of the part obtained in step c).

9. The method according to claim 8, wherein step b) of gradient heat treatment of the part obtained in step a) includes:
b1—a first heating of a region of the part at a first temperature (T1) greater than a solvus temperature of a gamma prime phase of said superalloy and less than a melting temperature of said superalloy.

10. The method according to claim 8, wherein step c) of final heat treatment comprises the following successive steps:
c1—solution heat treatment of the entire part obtained in step b) at a temperature (T2) less than the solvus temperature of the gamma prime phase of said superalloy;
c2—quenching treatment of the entire part obtained in step c1);
c3—tempering treatment of the entire part obtained in step c2).

11. The method according to claim 10, wherein step c3) is carried out at a temperature greater than 760° C.

12. A part made of superalloy according to claim 1, having a dual microstructure.

13. The part according to claim 12, wherein the part is a turbomachine part.

14. The part according to claim 12, wherein the part is a turbine part.

15. The part according to claim 12, wherein the part is a turbine disc, a compressor disc, a ring, a flange or a turbine housing.

16. The Nickel-based superalloy according to claim 1, wherein the composition comprises, in percent by weight of the total composition:
- Chromium: 10.0-11.0;
- Cobalt: 12.0-13.0;
- Molybdenum: 3.3-3.7;
- Tungsten: 3.1-3.5;
- Aluminium: 3.2-3.5;
- Titanium: 4.6-5.0;
- Niobium: 1.9-2.0;
- Hafnium: 0.25-3.0;
- Zirconium: 0.050-0.060;
- Carbon: 0.015-0.025;
- Boron: 0.01-0.02;
- Nickel: remainder
- as well as unavoidable impurities;
- the composition being free of tantalum.

17. The Nickel-based superalloy according to claim 16, wherein the composition essentially consists of, in percent by weight of the total composition:
- Chromium: 10.0-11.0;
- Cobalt: 12.0-13.0;
- Molybdenum: 3.3-3.7;
- Tungsten: 3.1-3.5;
- Aluminium: 3.2-3.5;
- Titanium: 4.6-5.0;
- Niobium: 1.9-2.0;
- Hafnium: 0.25-3.0;
- Zirconium: 0.050-0.060;
- Carbon: 0.015-0.025;
- Boron: 0.01-0.02;
- Nickel: remainder
- as well as unavoidable impurities;
- the composition being free of tantalum.

18. The Nickel-based superalloy according to claim 1, wherein the composition essentially consists of, in percent by weight of the total composition:
- Chromium: 10.0-11.25;
- Cobalt: 11.2-13.7;
- Molybdenum: 3.1-3.8;
- Tungsten: 3.1-3.8;
- Aluminium: 2.9-3.5;
- Titanium: 4.6-5.6;
- Niobium: 1.9-2.3;
- Hafnium: 0.25-0.35;
- Zirconium: 0.040-0.060;
- Carbon: 0.010-0.030;
- Boron: 0.01-0.030;
- Nickel: remainder
- as well as unavoidable impurities;
- the composition being free of tantalum.

* * * * *